(12) United States Patent
Ono

(10) Patent No.: US 7,446,810 B2
(45) Date of Patent: Nov. 4, 2008

(54) IMAGE CAPTURING APPARATUS AND AN IMAGE CAPTURING METHOD

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 729 days.

(21) Appl. No.: 11/115,305

(22) Filed: Apr. 27, 2005

(65) Prior Publication Data

US 2005/0253953 A1 Nov. 17, 2005

(30) Foreign Application Priority Data

Apr. 30, 2004 (JP) ............................. 2004-136397

(51) Int. Cl.
*G03B 13/00* (2006.01)
*G03B 17/00* (2006.01)
*G03B 3/00* (2006.01)
*G03B 3/10* (2006.01)
*G03B 13/34* (2006.01)
*H04N 5/232* (2006.01)

(52) U.S. Cl. ..................... 348/345; 348/347; 348/350; 348/349; 396/79; 396/81; 396/82; 396/103; 396/104; 396/121; 396/123; 396/124

(58) Field of Classification Search ............... 348/345, 348/347, 349, 350; 396/79, 81, 82, 103, 396/104, 121, 123, 124

See application file for complete search history.

(56) References Cited

U.S. PATENT DOCUMENTS 4,853,789 A * 8/1989 Murashima et al. ......... 348/352
5,003,339 A * 3/1991 Kikuchi et al. ............. 396/100
5,031,049 A * 7/1991 Toyama et al. ............. 348/352
5,210,566 A * 5/1993 Nishida ...................... 396/123
5,418,595 A * 5/1995 Iwasaki et al. .............. 396/95
5,422,673 A * 6/1995 Kondo et al. ............... 348/352
5,475,466 A * 12/1995 Iwasaki et al. .............. 396/153
6,222,587 B1 * 4/2001 Ito et al. ..................... 348/345

FOREIGN PATENT DOCUMENTS

JP  2003-222790 A  8/2003

* cited by examiner

*Primary Examiner*—David Ometz
*Assistant Examiner*—Tuan H Le
(74) *Attorney, Agent, or Firm*—Sughrue Mion, PLLC

(57) ABSTRACT

An image capturing apparatus includes an image capturing unit for capturing an image of an object; a focal length storing unit for storing a focal length of the object which is outside of an image capturing region of the image being captured by the image capturing unit by corresponding to a positional relationship between the image capturing unit and the object; an image capturing region variation detecting unit for detecting variation in the image capturing region of the image capturing unit; a positional relationship predicting unit for predicting a positional relationship between the image capturing unit and the object after the image capturing region of the image capturing unit is varied on the basis of the variation in the image capturing region detected by the image capturing region variation detecting unit; and a focus adjustment control unit for controlling focus adjustment by the image capturing unit on the basis of the focal length stored by the focal length storing unit, wherein the focal length is corresponded to the positional relationship predicted by the positional relationship predicting unit.

8 Claims, 6 Drawing Sheets

114

| θ [°] | FOCAL LENGTH [m] |
|---|---|
| −180 | 5 |
| −150 | 7 |
| ⋮ | ⋮ |
| −30 | 6 |
| 0 | 7 |
| +30 | 10 |
| ⋮ | ⋮ |
| +150 | 8 |
| +180 | 4 |

*FIG. 4*

IMAGE CAPTURING APPARATUS AND AN IMAGE CAPTURING METHOD

This patent application claims priority from a Japanese patent application No. 2004-136397 filed on Apr. 30, 2004, the contents of which are incorporated herein by reference.

BACKGROUND OF THE INVENTION

1. Field of the Invention

The present invention relates to an image capturing apparatus and an image capturing method. More particularly, the present invention relates to an image capturing apparatus and an image capturing method which is capable of performing fast focus adjustment for an object which enters a new image capturing region in case the image capturing region is varied.

2. Description of the Related Art

An automatic focusing function of a conventional image capturing apparatus measures a distance between the image capturing apparatus and an object at a distance measurement point in an image capturing region and performs focus adjustment on the basis of the measured distance. Recently, an image capturing apparatus measures successively distance between the image capturing apparatus and an object moving in an image capturing region, and thus, predicts a position of an object when an image of the object is captured and performs focus adjustment in advance (for example, see Japanese Patent Application Laying Open No. 2003-222790).

However, the conventional automatic focusing function measures the distance between the image capturing apparatus and the object in the image capturing region and performs the focus adjustment on the basis of the measured distance. Thus, in case the image capturing region is varied such as case the direction of the image capturing apparatus is quite varied, a distance between the image capturing apparatus and an object after the image capturing region is varied and then the focus adjustment should be performed. Therefore, the focus adjustment cannot be properly performed just after the image capturing region is varied and thus the image captured just after the image capturing region is varied is rather dim. In other words, because the conventional automatic focusing function needs a predetermined time to perform the focus adjustment for an object which enters the image capturing region, in case a user changes fast the direction of the image capturing apparatus to capture an image of the object and an image of an object which enters into the image capturing region at high speed is captured, it is impossible to make the focus adjustment follow up the object fast and perform the focus adjustment properly to capture an image of the object.

SUMMARY OF THE INVENTION

Therefore, it is an object of the present invention to provide an image capturing apparatus and an image capturing method, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus includes an image capturing unit for capturing an image of an object; a focal length storing unit for storing a focal length of the object which is outside of an image capturing region of the image being captured by the image capturing unit by corresponding to a positional relationship between the image capturing unit and the object; an image capturing region variation detecting unit for detecting variation in the image capturing region of the image capturing unit; a positional relationship predicting unit for predicting a positional relationship between the image capturing unit and the object after the image capturing region of the image capturing unit is varied on the basis of the variation in the image capturing region detected by the image capturing region variation detecting unit; and a focus adjustment control unit for controlling focus adjustment by the image capturing unit on the basis of the focal length stored by the focal length storing unit, wherein the focal length is corresponded to the positional relationship predicted by the positional relationship predicting unit.

The image capturing region variation detecting unit may detect the variation in the image capturing region of the image capturing unit by detecting movement of the image capturing unit.

The image capturing unit may capture a plurality of images successively, and the image capturing region variation detecting unit may detect the variation in the image capturing region of the image capturing unit by comparing the plurality of images captured by the image capturing unit.

The focal length storing unit may store the focal length of the object which is outside of the image capturing region of the image being captured by the image capturing unit by corresponding a direction of the image capturing unit, the image capturing region variation detecting unit may detect variation in the direction of the image capturing unit on the basis of the variation in the image capturing unit of the image capturing unit, the positional relationship predicting unit may predict the direction of the image capturing unit after the direction of the image capturing unit is varied on the basis of the variation of the direction of the image capturing unit detected by the image capturing region variation detecting unit, and the focus adjustment control unit may control the focus adjustment by the image capturing unit on the basis of the focal length to the object which is outside of the image capturing region of the image capturing unit stored by the focal length storing unit and corresponded to the direction of the image capturing unit predicted by the positional relationship predicting unit.

The image capturing apparatus may further include a focal length measuring unit for measuring the focal length of the object, wherein the focal length storing unit may store the focal length measured by the focal length measuring unit in the past and corresponded to the positional relationship between the image capturing unit and the object, and the focus adjustment control unit may control the focus adjustment by the image capturing unit on the basis of the focal length measured in the past and stored by the focal length storing unit in case the image capturing region of the image capturing unit is varied.

The image capturing apparatus may further include a focal length measuring unit for measuring the focal length of the object which is outside of the image capturing region of the image being captured by the image capturing unit, wherein the focal length storing unit may store the focal length measured by the focal length measuring unit and corresponded to the positional relationship between the image capturing unit and the object, and the focus adjustment control unit may control the focus adjustment by the image capturing unit on the basis of the focal length of the object which is outside of the image capturing region of the image capturing unit stored by the focal length storing unit in case the image capturing region of the image capturing unit is varied.

The focal length measuring unit may measure a focal length of an object which is outside of an image capturing region of an image captured by the image capturing unit by using electronic zooming, the focal length storing unit may store the focal length measured by the focal length measuring unit by corresponding it to a positional relationship between the image capturing unit and the object; and the focus adjustment control unit may control the focus adjustment by the image capturing unit on the basis of the focal length of the object which is outside of the image capturing region of the image capturing unit stored by the focal length storing unit in case the image capturing region of the image capturing unit is varied.

According to the second aspect of the present invention, an image capturing method includes the steps of: storing a focal length of an object which is outside of an image capturing region of an image being captured by an image capturing apparatus in a focal length storing unit by corresponding the focal length to a positional relationship between the image capturing apparatus and the object; detecting variation in the image capturing region of the image capturing apparatus; predicting the positional relationship between the image capturing apparatus and the object after the image capturing region of the image capturing apparatus is varied on the basis of the detected variation in the image capturing region; controlling focus adjustment by the image capturing apparatus on the basis of the focal length stored in the focal length storing unit and corresponded to the predicted positional relationship; and capturing an image of the object after the focus adjustment is performed.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 4 shows an example of data stored by a focal length storing unit 114.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
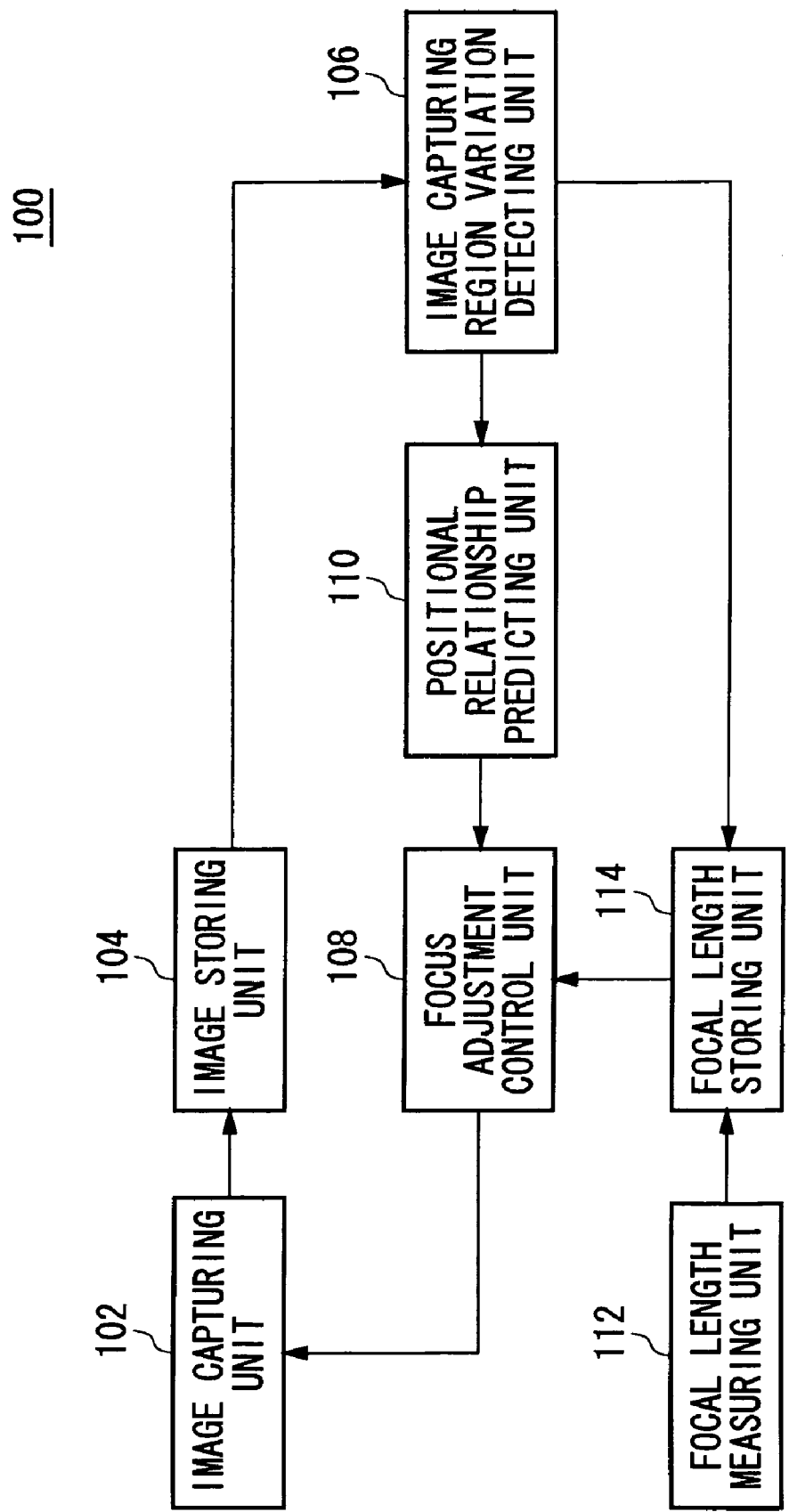
FIG. 1 shows an example of the configuration of an image capturing apparatus 100.

FIG. 1 shows an example of the configuration of an image capturing apparatus 100 according to an embodiment of the present invention. According to the present embodiment, it is an object of the present invention to perform fast and accurate focus adjustment for an object entering an image capturing region, which is a region of the object projected on a finder or a liquid crystal display, in case the image capturing region is varied due to variation in the direction of the image capturing apparatus 100, movement of the object, and the like. By this, even in case the direction of the image capturing apparatus 100 is varied fast to capture an image and an image of an object which enters the image capturing region at high-speed is captured, it is possible to capture a good quality image in focus.

The image capturing apparatus 100 includes an image capturing unit 102, an image storing unit 104, an image capturing region variation detecting unit 106, a focus adjustment control unit 108, a positional relationship predicting unit 110, a focal length measuring unit 112, and a focal length storing unit 114. The image capturing apparatus 100 may be a digital still camera, a digital movie camera, and a mobile phone with a function of camera.

The image capturing unit 102 has an automatic focusing function and performs focus adjustment for an object on the basis of control of the focus adjustment control unit 108. Then, the image capturing unit 102 receives light emitted from an object by using an image capturing device such as a CCD and captures an image of an object which is in the image capturing region. The image storing unit 104 stores the image captured by the image capturing unit 102. Here, the image storing unit 104 stores an image of an object emitting light which is received by the image capturing device of the image capturing unit 102 in case the user gives no instruction in addition to an image captured by the user's pressing a release button.

The image capturing region variation detecting unit 106 detects variation in the image capturing region of the image capturing unit 102 on the basis of a plurality of images which are successively captured by the image capturing unit 102 and stored by the image storing unit 104. Specifically, the image capturing region variation detecting unit 106 detects variation in the image capturing region of the image capturing unit 102 by comparing the plurality of images successively captured by the image capturing unit 102 which is the so called optical flow. Further, according to another example, the image capturing region variation detecting unit 106 may have a gyroscope and detect variation in the image capturing region of the image capturing unit 102 by detecting movement of the image capturing apparatus 100.

The image capturing region variation detecting unit 106 detects the variation in the image capturing region of the image capturing unit 102 by the optical flow or the gyroscope and detects variation in a relative position between the image capturing unit 102 and the object on the basis of the detected variation in the image capturing region. For example, the image capturing region variation detecting unit 106 detects variation in the direction of the image capturing unit toward an object. Here, the image capturing region is a region of an object emitting light to the image capturing device, that is, a region of which image can be captured by the image capturing unit 102. The image capturing region is determined according to the direction and the position of the image capturing unit 102 and the position of the object. Therefore, it is possible to acquire a positional relationship between the image capturing unit 102 and the object by detecting the variation in the image capturing region. Further, in case the image capturing unit 102 uses an electronic zooming, the image capturing region may be a region located in the zoom of which image is captured by the electronic zooming.

The focal length storing unit 114 stores a focal length of an object around the image capturing apparatus 100 which corresponds to the relative position of the image capturing unit 102 and the object. The focal length storing unit 114 stores not only a focal length of an object located in an image capturing region which is a region of an image captured by the image capturing unit 102 but also a focal length of an object which is outside of the image capturing region, which correspond to the positional relationship between the image capturing unit 102 and the object. For example, the focal length storing unit 114 stores the focal length of an object which is inside or outside of the image capturing region, which corresponds to the direction of the image capturing unit 102. Specifically, the focal length storing unit 114 sets a predetermined direction from the image capturing unit 102 to a reference direction and stores a focal length of an object which exists in each direction at an angle of the horizontal direction and the vertical direction with respect to the reference direction, which corresponds to the direction.

The focal length measuring unit 112 has a plurality of distance measuring sensors for measuring the distance to an object which is inside or outside of the image capturing region and measures not only a focal length of an object which is in the image capturing region but also a focal length of an object which is outside of the image capturing region. Further, the focal length measuring unit 112 may measure a focal length of an object which is outside of the image capturing region of an image captured by the electronic zooming of the image capturing unit 102. The focal length storing unit 114 stores the focal length measured by the focal length measuring unit 112 which corresponds to the positional relationship between the image capturing unit 102 and the object detected by the image capturing region variation detecting unit 106. Further, the focal length measuring unit 112 consecutively measures focal lengths of an object around the image capturing apparatus 100 even in case the image capturing unit 102 does not capture an image and stores them in the focal length storing unit 114. Thus, the focal length storing unit 114 stores the focal length measured previously by the focal length measuring unit 112 which corresponds to the positional relationship between the image capturing unit 102 and the object.

The positional relationship predicting unit 110 predicts a positional relationship between the image capturing unit 102 and the object after the image capturing region of the image capturing unit 102 is varied on the basis of the variation in the image capturing region detected by the image capturing region variation detecting unit 106. Specifically, the positional relationship predicting unit 110 predicts the direction of the image capturing unit 102 after the direction of the image capturing unit 102 is varied on the basis of the variation in the direction of the image capturing unit 102 detected by the image capturing region variation detecting unit 106.

The focal length adjustment control unit 108 controls focus adjustment of the image capturing unit 102 on the basis of the focal length which corresponds to the positional relationship between the image capturing unit 102 and the object predicted by the positional relationship predicting unit 110 and is stored by the focal length storing unit 114. Specifically, the focal length adjustment control unit 108 controls focal length adjustment of the image capturing unit 102 on the basis of the focal length to an object outside of the image capturing region of the image capturing unit 102 which is measured by the distance measuring sensor of the focal length measuring unit 112 and stored by the focal length storing unit 114 to be corresponded to the direction of the image capturing unit 102 predicted by the positional relationship predicting unit 110. On the other hand, the focus adjustment control unit 108 controls focus adjustment of the image capturing unit 102 on the basis of the focal length which is measured previously by the distance measuring sensor of the focal length measuring unit 122 and stored by the focal length storing unit 114 in case the image capturing region is varied.

As above, the direction of the image capturing apparatus 100 of the present embodiment is varied by the user and thus the image capturing region is varied. The image capturing apparatus 100 predicts that an object which is outside of the image capturing region would enter the image capturing region and makes the focal length follow up the object which is to enter the image capturing region, that is, the object which is outside of the image capturing region. By this, in case the user changes fast the direction of the image capturing apparatus 100 to capture an image of an object and an image of an object which enters into the image capturing region at high speed is captured, it is possible to perform fast and properly focus adjustment for the object to capture an image following up the focus adjustment to obtain an image of good quality.

Figure 2:
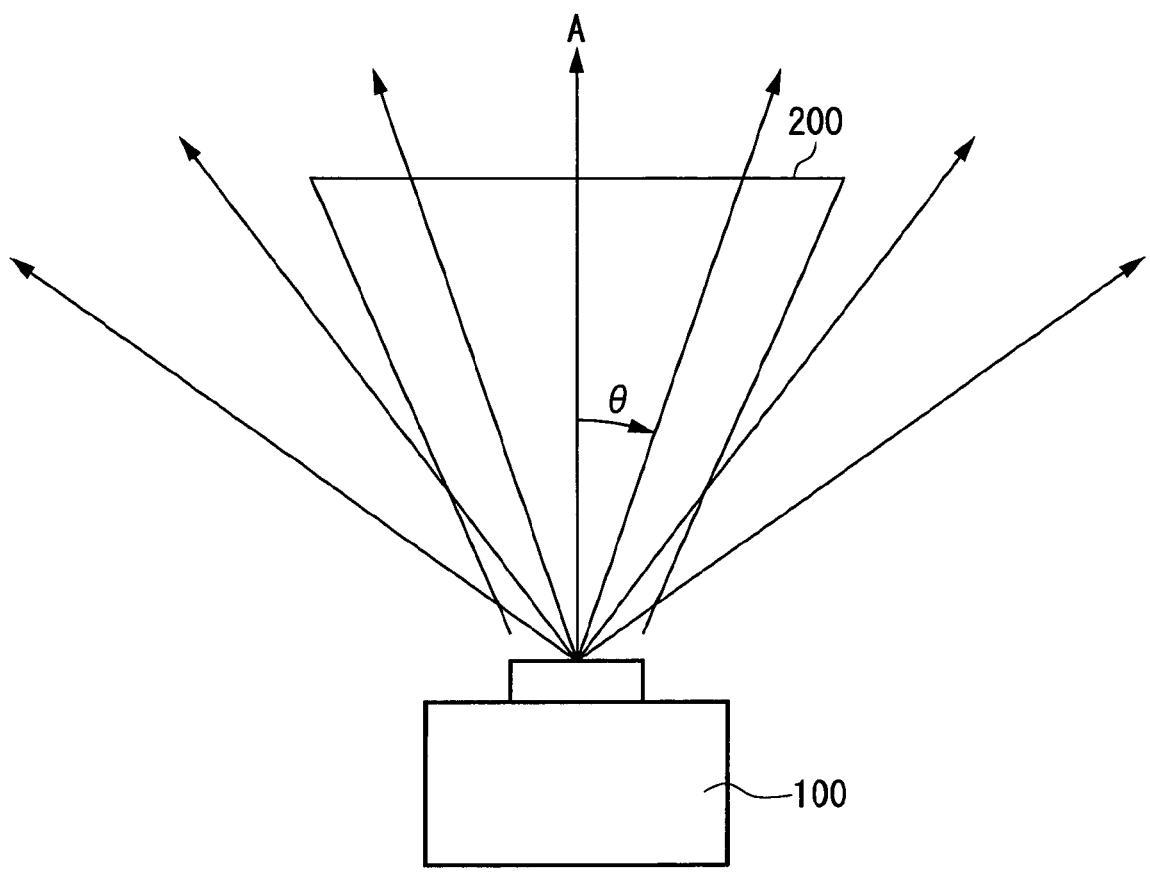
FIG. 2 shows an example of a relationship between an image capturing region 200 and a distance measurement point 300.
Figure 3:
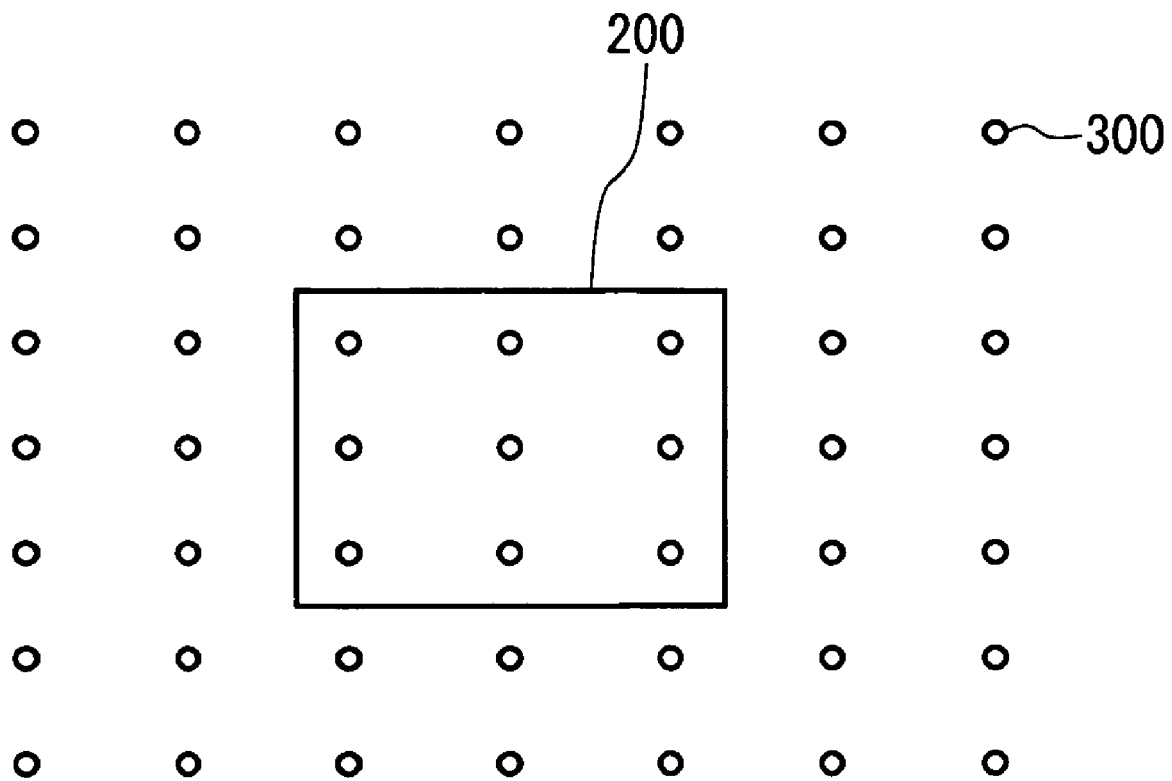
FIG. 3 shows an example of a relationship between an image capturing region 200 and a distance measurement point 300.

FIGS. 2 and 3 show examples of a relationship between an image capturing region 200 and a distance measurement point 300 according to the present embodiment. As shown in FIGS. 2 and 3, the focal length measuring unit 112 has the plurality of distance measuring sensors each of which measures a focal length of an object for the distance measurement points 300 of a plurality of directions inside and outside of the image capturing region 200 of the image capturing unit 102.

As shown in FIG. 2, the focal length measuring unit 112 measures a focal length of each object for each distance measurement point 300 described as a predetermined angle ($\theta$) from a reference direction A with respect to the image capturing apparatus 100. Then, the focal length storing unit 114 stores the focal lengths measured for the plurality of distance measurement point 300 to be corresponded to the angle ($\theta$) from the reference direction A with respect to the image capturing apparatus 100.

Further, as shown in FIG. 3, the focal length measuring unit 112 measures the focal length of the object for each of the plurality of distance measurement points 300 which are in the image capturing region 200 and which exist outside of the image capturing region 200 in the horizontal direction, the vertical direction, and inclined directions with respect to the image capturing region 200. Then, the focal length storing unit 114 stores the focal lengths measured for the plurality of distance measurement points 300 which are in the image capturing region 200 and which exist outside of the image capturing region 200 in the horizontal direction, the vertical direction, and inclined directions with respect to the image capturing region 200, to be corresponded to the angles ($\theta$) of the horizontal direction and the angles ($\theta$) of the vertical direction from the reference direction A with respect to the image capturing apparatus 100.

Thus, by measuring previously the focal length of each of the objects which are outside of the image capturing region 200 in all directions, it is possible to perform fast focus adjustment for an object which enters a new image capturing region 200 in case of capturing an image just after the direction of the image capturing apparatus 100 is varied in the vertical direction and an inclined direction in addition to the case of capturing an image just after the direction of the image capturing apparatus 100 is varied in the horizontal direction. The image capturing region 200 may be a region of an object emitting light which can be received by the image capturing device of the image capturing unit 102 or a region which is in the zoom in case the image capturing unit 102 captures an image of the object by using the electronic zooming.

FIG. 4 shows an example of data stored by the focal length storing unit 114 according to the present embodiment. The focal length storing unit 114 stores a focal length of an object for a direction from the reference direction of the image capturing unit 102 to be corresponded to the direction. It is preferable to always measure a focal length of an object which is inside and outside of the image capturing region regardless of whether the user instructs to capture an image and to update the focal length of the object in each direction at every time the focal length is measured by the focal length measuring unit 112. Thus, it is possible to quickly detect an object which enters the image capturing region and to begin control of the focus adjustment in advance.

Further, the focal length storing unit 114 according to the present example stores the focal length of the object to be corresponded to an angle in one direction. However, as described above, the focal length storing unit 114 may store the focal length to be corresponded to angles in two directions, that is, the horizontal and vertical directions.

Figure 5:
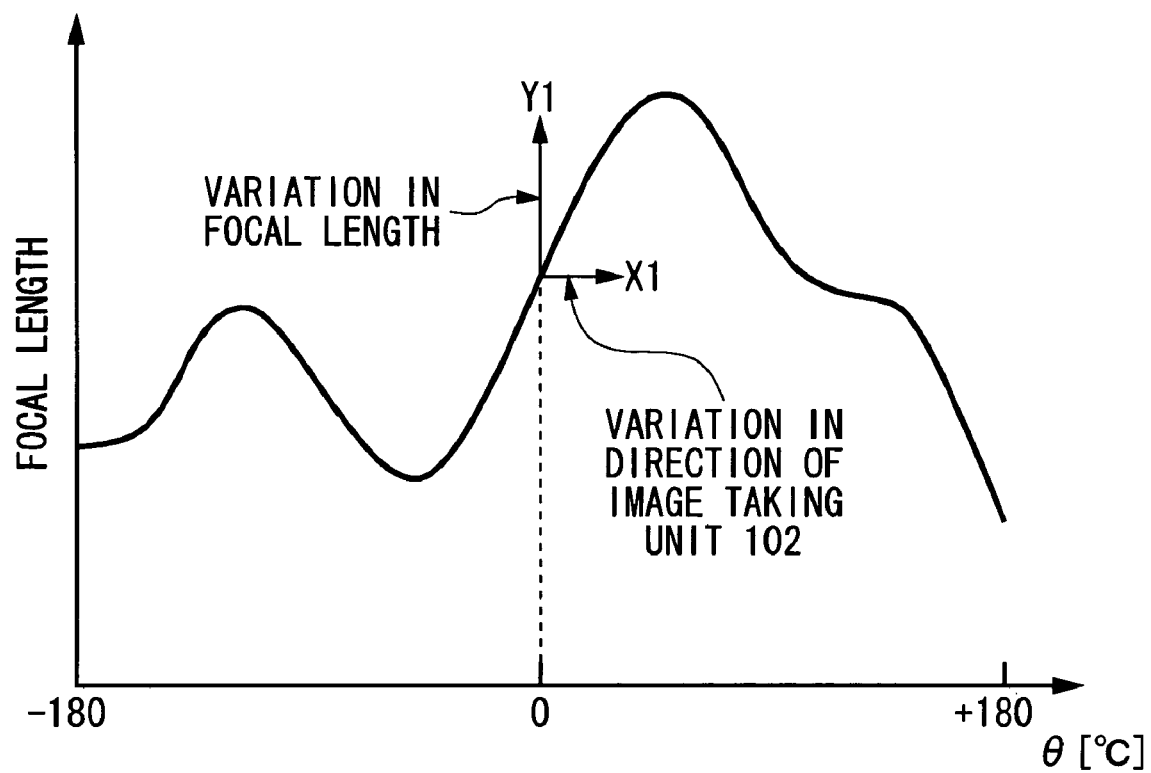
FIG. 5 shows an example of a method of focus adjustment.

FIG. 5 shows an example of a method of focus adjustment according to the present embodiment. FIG. 5 explains a method of focus adjustment by the focus adjustment control unit 108 in case the direction of the image capturing unit 102 is varied, for example, by the user. In FIG. 5, the abscissa and the ordinate show the focal length and the corresponding direction of the image capturing unit 102 stored by the focal length storing unit 114, respectively. Further, the angle θ is 0 before the direction of the image capturing unit 102 is varied.

In case the user changes the direction of the image capturing apparatus 100 and thus the direction of the image capturing unit 102 is varied, the image capturing region variation detecting unit 106 detects variation in the direction of the image capturing unit 102 by the optical flow or the gyroscope. Then, the positional relationship predicting unit 110 predicts the direction of the image capturing unit 102 after the direction of the image capturing unit 102 is varied on the basis of the variation in the direction of the image capturing unit 102 detected by the image capturing region variation detecting unit 106. The focus adjustment control unit 108 extracts a focal length stored by the focal length storing unit 114 which is corresponded to the direction of the image capturing unit 102 predicted by the positional relationship predicting unit 110. Then, the focus adjustment control unit 108 performs focus adjustment of the image capturing unit 102 on the basis of the focal length extracted from the focal length storing unit 114. In other words, the focus adjustment control unit 108 performs slowly focus adjustment to adapt to the variation in the focal length of the object (Y1) corresponding to the variation in the direction of the image capturing unit 102 (X1) detected by the image capturing region variation detecting unit 106. The image capturing unit 102 captures an image of the object according to an instruction by the user, such as pressing the release button after the focus adjustment is performed by the focus adjustment control unit 108.

Thus, by beginning to drive a driving motor of a lens for adjusting focus of the image capturing unit 102 in advance on the basis of the variation in the direction of the image capturing region 102 detected by the image capturing region variation detecting unit 106 and predicted by the positional relationship predicting unit 110, it is possible to compensate delay of follow-up of the focus adjustment due to delay in acceleration of the driving motor at the time of driving. As a result, it is possible to reduce time taken to finish the focus adjustment for the object which is in the image capturing region after the direction of the image capturing unit 102 is varied.

Further, a focal length may be measured for an object which is in the image capturing region of the image capturing unit 102 while the variation in the direction of the image capturing unit 102 is predicted and the focal length is varied as described above, and focus adjustment may be performed one more time on the basis of a focal length of an object which is in the image capturing region after the direction of the image capturing unit 102 is not varied. In this case, it is also possible to reduce time taken to finish the focus adjustment and to capture an image at a proper focal length in a short time, comparing with the case focus adjustment does not begin until the direction of the image capturing unit 102 is not varied.

Figure 6:
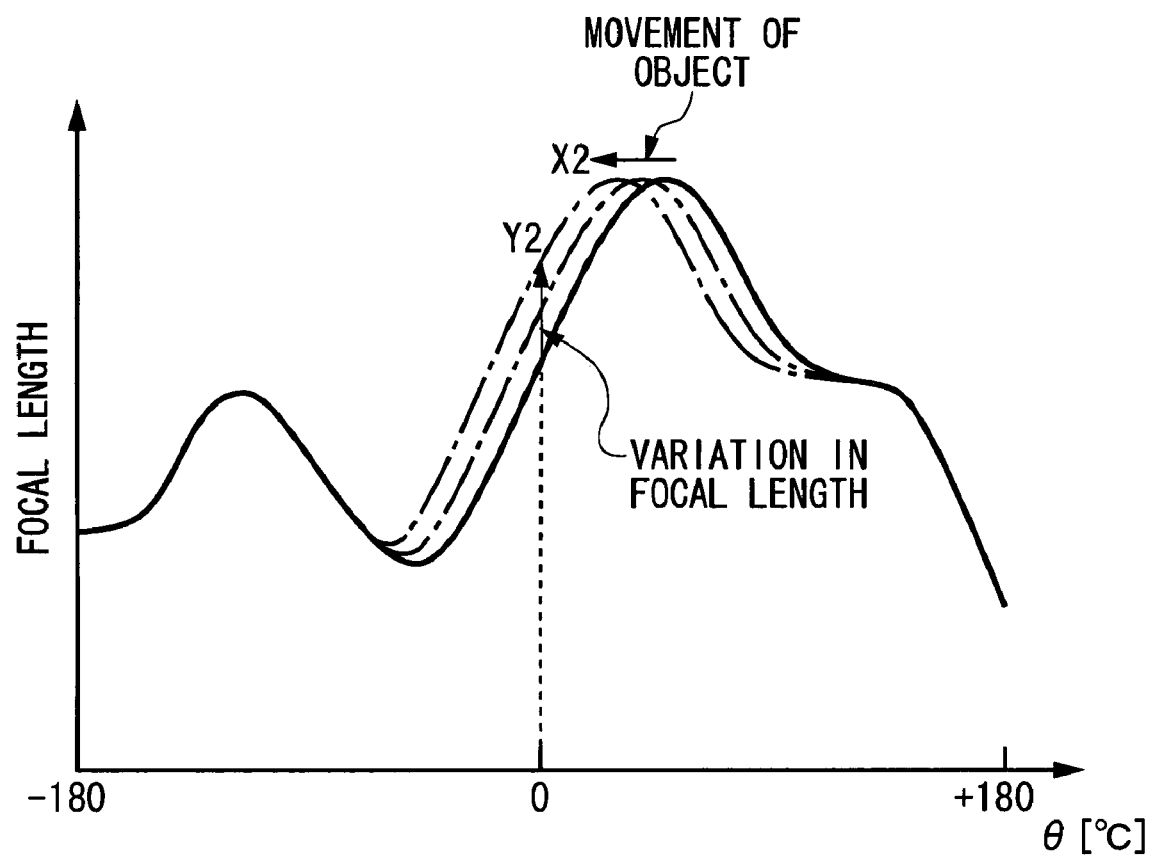
FIG. 6 shows an example of a method of focus adjustment.

FIG. 6 shows an example of a method of focus adjustment according to the present embodiment. FIG. 6 explains a method of focus adjustment by the focus adjustment control unit 108 in case an object which is in the image capturing region of the image capturing unit 102 is varied, for example, by movement of the object. In FIG. 6, the abscissa and the ordinate show the focal length and the corresponding direction of the image capturing unit 102 stored by the focal length storing unit 114, respectively. Further, the angle θ is 0 before the direction of the image capturing unit 102 is varied.

In case the object moves and thus the object which is in the image capturing region is varied, the image capturing region variation detecting unit 106 detects variation in the image capturing region, that is, the movement of the object by the optical flow or the gyroscope. Then, the focal length storing unit 114 updates the focal length of each direction varied due to the variation in the object on the basis of the focal length measured by the focal length measuring unit 112. The positional relationship predicting unit 110 predicts a positional relationship between the image capturing unit 102 and the object after the image capturing region is varied on the basis of the variation in the image capturing region detected by the image capturing region variation detecting unit 106. The focus adjustment control unit 108 extracts a focal length stored by the focal length storing unit 114 which is corresponded to the positional relationship between the image capturing unit 102 and the object predicted by the positional relationship predicting unit 110. Then, the focus adjustment control unit 108 performs focus adjustment of the image capturing unit 102 on the basis of the focal length extracted from the focal length storing unit 114. In other words, the focus adjustment control unit 108 performs slowly focus adjustment to adapt to the variation in the focal length of the object (Y2) corresponding to the variation in the image capturing region (X2) detected by the image capturing region variation detecting unit 106. The image capturing unit 102 captures an image of the object according to an instruction by the user, such as pressing the release button after the focus adjustment is performed by the focus adjustment control unit 108.

Thus, by beginning to drive the driving motor of the lens for adjusting focus of the image capturing unit 102 in advance on the basis of the variation in the positional relationship between the image capturing region 102 and the object detected by the image capturing region variation detecting unit 106 and predicted by the positional relationship predicting unit 110, it is possible to compensate delay of follow-up of the focus adjustment due to delay in acceleration of the driving motor at the time of driving. As a result, it is possible to reduce time taken to finish the focus adjustment for the object which is in the image capturing region after the positional relationship between the image capturing unit 102 and the object is varied.

Further, a focal length may be measured for an object which is in the image capturing region of the image capturing unit 102 while the variation in the positional relationship between the image capturing unit 102 and the object is predicted and the focal length is varied as described above, and focus adjustment may be performed one more time on the basis of a focal length of an object which is in the image capturing region when the user pushes the release button. In this case, it is also possible to reduce time taken to finish the focus adjustment and to capture an image at a proper focal length in a short time, comparing with the case focus adjustment does not begin until the user pushes the release button.

According to the image capturing apparatus of the present invention, it is possible to perform fast focus adjustment for an object which enters an image capturing region in case the image capturing region is varied.

Although the present invention has been described by way of exemplary embodiments, it should be understood that those skilled in the art might make many changes and substitutions without departing from the spirit and the scope of the present invention which is defined only by the appended claims.

What is claimed is:

1. An image capturing apparatus comprising:
   an image capturing unit for capturing an image of an object;
   a focal length storing unit for storing a focal length of the object which is outside of an image capturing region of the image being captured by said image capturing unit by corresponding to a positional relationship between said image capturing unit and the object;
   an image capturing region variation detecting unit for detecting variation in the image capturing region of said image capturing unit;
   a positional relationship predicting unit for predicting a positional relationship between said image capturing unit and the object after the image capturing region of said image capturing unit is varied on the basis of the variation in the image capturing region detected by said image capturing region variation detecting unit; and
   a focus adjustment control unit for controlling focus adjustment by said image capturing unit on the basis of the focal length stored by said focal length storing unit, wherein the focal length is corresponded to the positional relationship predicted by said positional relationship predicting unit.

2. An image capturing apparatus as claimed in claim 1, wherein said image capturing region variation detecting unit detects the variation in the image capturing region of said image capturing unit by detecting movement of said image capturing unit.

3. An image capturing apparatus as claimed in claim 1, wherein
   said image capturing unit captures a plurality of images successively, and
   said image capturing region variation detecting unit detects the variation in the image capturing region of said image capturing unit by comparing the plurality of images captured by said image capturing unit.

4. An image capturing apparatus as claimed in claim 1, wherein
   said focal length storing unit stores the focal length of the object which is outside of the image capturing region of the image being captured by said image capturing unit by corresponding a direction of said image capturing unit,
   said image capturing region variation detecting unit detects variation in the direction of said image capturing unit on the basis of the variation in the image capturing unit of said image capturing unit,
   said positional relationship predicting unit predicts the direction of said image capturing unit after the direction of said image capturing unit is varied on the basis of the variation of the direction of said image capturing unit detected by said image capturing region variation detecting unit, and
   said focus adjustment control unit controls the focus adjustment by said image capturing unit on the basis of the focal length to the object which is outside of the image capturing region of said image capturing unit stored by said focal length storing unit and corresponded to the direction of said image capturing unit predicted by said positional relationship predicting unit.

5. An image capturing apparatus as claimed in claim 1 further comprising:
   a focal length measuring unit for measuring the focal length of the object,
   wherein said focal length storing unit stores the focal length measured by said focal length measuring unit in the past and corresponded to the positional relationship between said image capturing unit and the object, and
   said focus adjustment control unit controls the focus adjustment by said image capturing unit on the basis of the focal length measured in the past and stored by said focal length storing unit in case the image capturing region of said image capturing unit is varied.

6. An image capturing apparatus as claimed in claim 1 further comprising:
   a focal length measuring unit for measuring the focal length of the object which is outside of the image capturing region of the image being captured by said image capturing unit,
   wherein said focal length storing unit stores the focal length measured by said focal length measuring unit and corresponded to the positional relationship between said image capturing unit and the object, and
   said focus adjustment control unit controls the focus adjustment by said image capturing unit on the basis of the focal length of the object which is outside of the image capturing region of said image capturing unit stored by said focal length storing unit in case the image capturing region of said image capturing unit is varied.

7. An image capturing apparatus as claimed in claim 6, wherein
   said focal length measuring unit measures a focal length of an object which is outside of an image capturing region of an image captured by said image capturing unit by using electronic zooming,
   said focal length storing unit stores the focal length measured by said focal length measuring unit by corresponding it to a positional relationship between said image capturing unit and the object; and
   said focus adjustment control unit controls the focus adjustment by said image capturing unit on the basis of the focal length of the object which is outside of the image capturing region of said image capturing unit stored by said focal length storing unit in case the image capturing region of said image capturing unit is varied.

8. An image capturing method comprising the steps of:
   storing a focal length of an object which is outside of an image capturing region of an image being captured by an image capturing apparatus in a focal length storing unit by corresponding the focal length to a positional relationship between the image capturing apparatus and the object;
   detecting variation in the image capturing region of the image capturing apparatus;
   predicting the positional relationship between the image capturing apparatus and the object after the image capturing region of the image capturing apparatus is varied on the basis of the detected variation in the image capturing region;

controlling focus adjustment by the image capturing apparatus on the basis of the focal length stored in the focal length storing unit and corresponded to the predicted positional relationship; and capturing an image of the object after the focus adjustment is performed.

* * * * *